Feb. 6, 1968
W. D. VOELKER
3,367,818
STRENGTHENING EDGES OF FOAM SANDWICH STRUCTURE
Filed Aug. 1, 1966
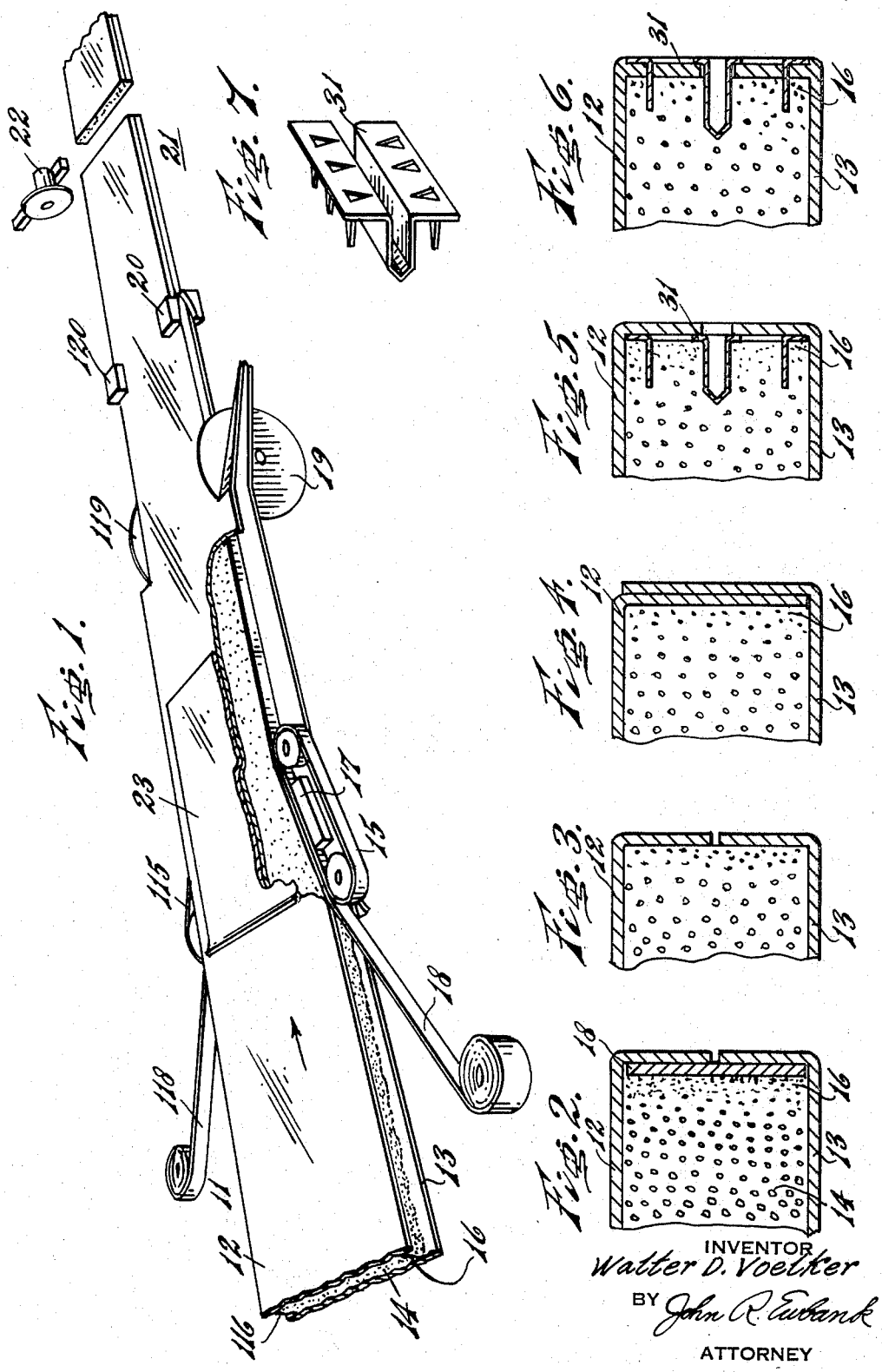
INVENTOR
Walter D. Voelker
BY John R. Eubank
ATTORNEY

3,367,818
STRENGTHENING EDGES OF FOAM SANDWICH STRUCTURE

Walter D. Voelker, Abington Township, Pa., assignor to Allied Chemical Corporation, New York, N.Y., a corporation of New York
Continuation-in-part of application Ser. No. 240,393, Nov. 27, 1962. This application Aug. 1, 1966, Ser. No. 569,165
7 Claims. (Cl. 156—216)

This application is a continuation-in-part of my copending application Ser. No. 240,393, filed Nov. 27, 1962 and now abandoned.

This invention relates to the manufacture of sandwich structures comprising a polyurethane foam core and particularly to the strengthening of the edge portions of such sandwich structures.

Heretofore machines have been devised for the production of sandwich members including a polyurethane foam core and upper and lower facing sheets. It has been the practice to trim the edge portions of the product leaving exposed at the edge a freshly cut polyurethane foam core. During the utilization of such products, the edges have sometimes been damaged by reason of being subjected to more severe strains than the main body of the sandwich structure.

In accordance with the present invention, the edge portion of an advancing strip of the core of a polyurethane sandwich structure is subjected to a densifying and compressive force and immediately thereafter subjected to sufficient heat to partially liquefy and set the polyurethane foam core, whereby greater strength is imparted to the edge portion of the sandwich structure.

In certain embodiments of the present invention, a portion of the overhanging facing sheet is folded into contact with the heat softened densified edge of the core to bond such portion of the facing sheet to the edge portions of the core.

The nature of the invention is further clarified by reference to the accompanying drawings. FIG. 1 is a schematic view of certain embodiments of the invention. FIG. 2 is a cross section of an edge portion of a sandwich structure prepared in accordance with one embodiment of the invention. FIGS. 3, 4, 5 and 6 are alternative embodiments of the invention. FIG. 7 is a perspective view of a clip shown in FIGS. 5 and 6.

Referring now in detail to FIG. 1, a production line for rigid polyurethane insulation panel includes means for preparing continuously advancing strip of sandwich 11, comprising an upper face 12 and a lower face 13 and a rigid polyurethane foam core 14 which may be produced from any of the well-known rigid polyurethane foam-forming formulations. The sandwich advances toward an edge densifying zone in which an endless belt 15, desirably covered with a suitable well-known mold release material such as polytetrafluoroethylene, acts upon an edge portion 16 of the core 14. Direct pressure contact of the heat-softened foam and belt 17 is desirably maintained over an extended length of the foam edge portion 16 until the foam is again relatively cool, e.g. below its softening temperature, to avoid disruption of the edge portion due to the tackiness of the heat softened foam. The belt 15 is heated through heater 17 to a temperature above the softening point of the edge portion 16, and the belt 15 is pressed against the edge portion 16 in such a manner as to force the polyurethane foam inwardly. Moreover, the heat imparted to the edge portion 16 is sufficient to soften the edge portion and to bring about the development of a densified skin at the point corresponding to the intended width of the advancing structure. The softening of the edge by heat may also be described as a partial melting of the edge. As shown in FIG. 1, sheet material, preferably a separate strip of sheet material 18, is desirably positioned for feeding into the space between the upper and lower facing sheets 12 and 13 and into direct non-adhesive bonding contact with the freshly softened edge portion. In such embodiment of the invention softening of the edge portion 16 is accomplished by application of heat from heater 17 through both the belt 15 and strip of sheet material 18. Similarly a filler strip 118 is advanced for bonding contact with edge 116 by contact with the densifying belt 115 on the opposite edge of the advancing sandwich. In this manner the strip of sheet material 18 and 118 are pressed directly and immediately into contact with the freshly softened foam ensuring a desirable highly uniform densification of the foam and uniform high strength bonding of the sheet material to the densified foam portion of edges 16 and 116. In this manner the edge portions 16 and 116 are transformed into relatively strong edge members defining a predetermined width and most efficiently in view of elimination of concern with problems created by the high tackiness of the heat-softened foam. Also, losses attributable to the cutting of scrap foam from the edge of the advancing sandwich strip 11 are by-passed. In all embodiments of the invention the foam edge portions 16 and 116 may be preheated, if desired, by suitable heaters (not shown), preferably radiant heater means placed along the production line prior to the densifying belts 15 and 115.

If the facing sheets are excessively wide so that the intended width of the sandwich member 11 is significantly narrower than the upper facing sheet 12 and/or lower facing sheet 13, such excess width of the facing sheets may be cut by means of revolving knives 19 and 119. In other embodiments a device for folding the edge of the facing sheet (and applying adhesive if required, i.e. if the strip 18 is not heat sealable) and bonding it to the edges 16 and 116 of the core and/or other members is indicated by the sealing device 20 and 120. The advancing strip of rigid polyurethane insulation panel with effectively sealed and strengthened edges then enters a product withdrawal zone 21 in which a saw 22 slices the strip into a series of panels. A platen 23 is positioned on the upper surface of the advancing sandwich 14 at a location intermediate the edge densifying belts 15 and 115, and a matching platen is beneath and sandwiched. Thus the pressure applied to the edge of the core does not cause distortion of a significant increase in the thickness of the sandwich but instead the densifying pressure and heat are absorbed in the transformation of the edge portion into the strong relatively high density skin at the edge of the core.

Several varieties of edge structure are attainable by the previously described method. Schematic showings of five embodiments of edge structures are shown in FIGS. 2–6. In each sectional view, the density of the main body of foam 14 is less than for the edge portion 16 by reason of the compressive action of the belt 15, and the differences among FIGS. 2–6 concern the supplementary strengthening of the edges.

FIG. 2 shows an especially preferred embodiment in which a paper strip 18 can be bonded directly to the densified skin 16 compressed from polyurethane foam initially having properties substantially the same as the main portion 14 of the polyurethane foam core. The upper facing sheet 12 and lower facing sheet 13 are folded over, coated with adhesive, and adhered to the filler strip 18.

FIG. 3 illustrates the edge structure substantially the same as FIG. 2 except that the edge is fabricated without using a filler strip 18. FIG. 4 shows an edge portion prepared by a method in which the upper and lower facing sheets, 12 and 13 respectively, are folded over for contact with each other, one of them being bonded to the heat softened and densified edge portion 16.

FIGS. 5, 6 and 7 show modifications of the invention in which the edge portion 16 is further strengthened by the inclusion of a clip 31 adapted to retain the desired dimensional stability and adapted to simplify the joining together of panels at their edges through connecting means analogous to tongue and groove joints. In FIG. 5 the clip 31 is adhered to the edge portion prior to the securing of the folded over facing sheets to the clip. In FIG. 6, the clip 31 is attached subsequent to the bonding of the facing sheets to the densified edge portion 16.

Various modifications of the invention are possible without departing from the scope of the appended claims.

I claim:

1. In a method for the continuous production of a sandwich structure comprising upper and lower facing sheets and a core of rigid polyurethane foam, the improvement which comprises: (1) placing sheet material in contact with the two surfaces defining the opposing longitudinal side-edges of the foam core as the sandwich structure is advanced subsequent to the time when the foam core becomes rigid; (2) compressing said longitudinal edge surfaces having said sheet material in contact therewith; (3) applying heat to said sheet material and compressed underlying foam sufficient to soften the underlying foam and form a dense protective skin therefrom; and (4) cooling said densified skin and sheet material to recover a sandwich structure having said sheet material bonded to said densified skin.

2. The method of claim 1 in which the sandwich structure is restrained against distortion and thickening during compression of the side-edge surfaces by confining the upper and lower facing sheet surfaces adjacent the compressed side-edge surfaces of the sandwich.

3. The method of claim 1 in which said sheet material is a separate strip of material continuously fed into position against said opposing longitudinal edge surfaces.

4. The method of claim 3 in which overlapping portions of said facing sheets are subsequently folded over and adhesively bonded to said strip of sheet material.

5. The method of claim 1 in which said sheet material is provided by folding over the overlapping portion of at least one of said facing sheets overlapping the longitudinal side-edges of the sandwich structure.

6. The method of claim 5 in which overlapping portions of both the upper and lower facing sheets are folded in contact with the side-edge surfaces prior to compression.

7. The method of claim 5 in which the overlapping portions of one of said facing sheets are folded in contact with said side-edge surfaces, and subsequently the overlapping portions of the other facing sheet are folded over and adhesively bonded to the folded-over portions of said first facing sheet.

References Cited
UNITED STATES PATENTS 2,866,730  12/1958  Potchen et al. _____ 156—79
3,303,076  2/1967  Carlson et al. _____ 156—79

ROBERT F. BURNETT, *Primary Examiner.*

W. J. VAN BALEN, *Assistant Examiner.*